US008415978B2

(12) United States Patent
Loidl et al.

(10) Patent No.: US 8,415,978 B2
(45) Date of Patent: Apr. 9, 2013

(54) STATE MACHINE FOR GENERATING A PULSE WIDTH MODULATION (PWM) WAVEFORM

(75) Inventors: Ales Loidl, Mukarov (CZ); Ignazio Bellomo, Rozanno (IT); Luca Giussani, San Vittore Olona (IT); David Vincenzoni, Usmate Velate (IT)

(73) Assignees: STMicroelectronics s.r.l., Agrate Brianza (MI) (IT); STMicroelectronics Design and Application s.r.o., Prague (CZ)

( * ) Notice: Subject to any disclaimer, the term of this patent is extended or adjusted under 35 U.S.C. 154(b) by 124 days.

(21) Appl. No.: 12/644,961

(22) Filed: Dec. 22, 2009

(65) Prior Publication Data

US 2010/0168873 A1    Jul. 1, 2010

(30) Foreign Application Priority Data

Dec. 29, 2008   (IT) ............... TO2008A0996

(51) Int. Cl.
G06F 7/38       (2006.01)
G06F 9/00       (2006.01)
G06F 9/44       (2006.01)
H03K 19/173     (2006.01)
H03K 3/00       (2006.01)

(52) U.S. Cl.
USPC ............... 326/46; 326/38; 327/201; 712/232

(58) Field of Classification Search .......... 326/46; 327/201–218; 712/232
See application file for complete search history.

(56) References Cited

U.S. PATENT DOCUMENTS

| 4,740,961 | A  | * | 4/1988  | Renner ............... 370/507 |
| 5,860,158 | A  | * | 1/1999  | Pai et al. ............ 711/118 |
| 6,571,308 | B1 | * | 5/2003  | Reiss et al. .......... 710/315 |
| 6,573,308 | B1 | * | 6/2003  | Braun et al. ............ 521/81 |
| 7,590,823 | B1 | * | 9/2009  | Ansari et al. ......... 712/34 |
| 2002/0013874 | A1 | * | 1/2002 | Gelke et al. ......... 710/305 |
| 2003/0140218 | A1 |   | 7/2003 | Sachs |
| 2004/0003355 | A1 | * | 1/2004 | DenBraber ........... 716/3 |
| 2004/0059443 | A1 | * | 3/2004 | Sharangpani ......... 700/48 |
| 2006/0220938 | A1 |   | 10/2006 | Leung |
| 2007/0159653 | A1 | * | 7/2007 | Dholakia et al. ....... 358/1.15 |
| 2008/0136342 | A1 | * | 6/2008 | Tamegai et al. ....... 315/209 R |

FOREIGN PATENT DOCUMENTS

JP   2009145957 A   7/2009

OTHER PUBLICATIONS

F. Ed Wagner; IEEE; "VFSM Executable Specification", Proceedings of the Annual European Conference on Computer Systems and Software Engineering (Compeuro). The Hague, May 4-8, 1992; pp. 226-231; ISBN:978-0-8186-2760-6.
Minister dello Sviluppo Ecoinomico; Italian Search Report for STMicroelectronics S.R.L.; Application No. TO20080996 dated Aug. 10, 2009; pp. 1-8.
EP Search Report, Stmicroelectronics Srl, et al, EP Application No. 09180740,4, Mar. 12, 2010, pp. 1-8.

* cited by examiner

*Primary Examiner* — Shawki Ismail
*Assistant Examiner* — Dylan White
(74) *Attorney, Agent, or Firm* — Hogan Lovells US LLP

(57) ABSTRACT

A state machine for generating signals configured for generating different signals according to the current state of the machine. The state machine is configured to change state both as a function of an internal timer and as a function of signals representative of events external to the state machine.

16 Claims, 5 Drawing Sheets

Figure 2:
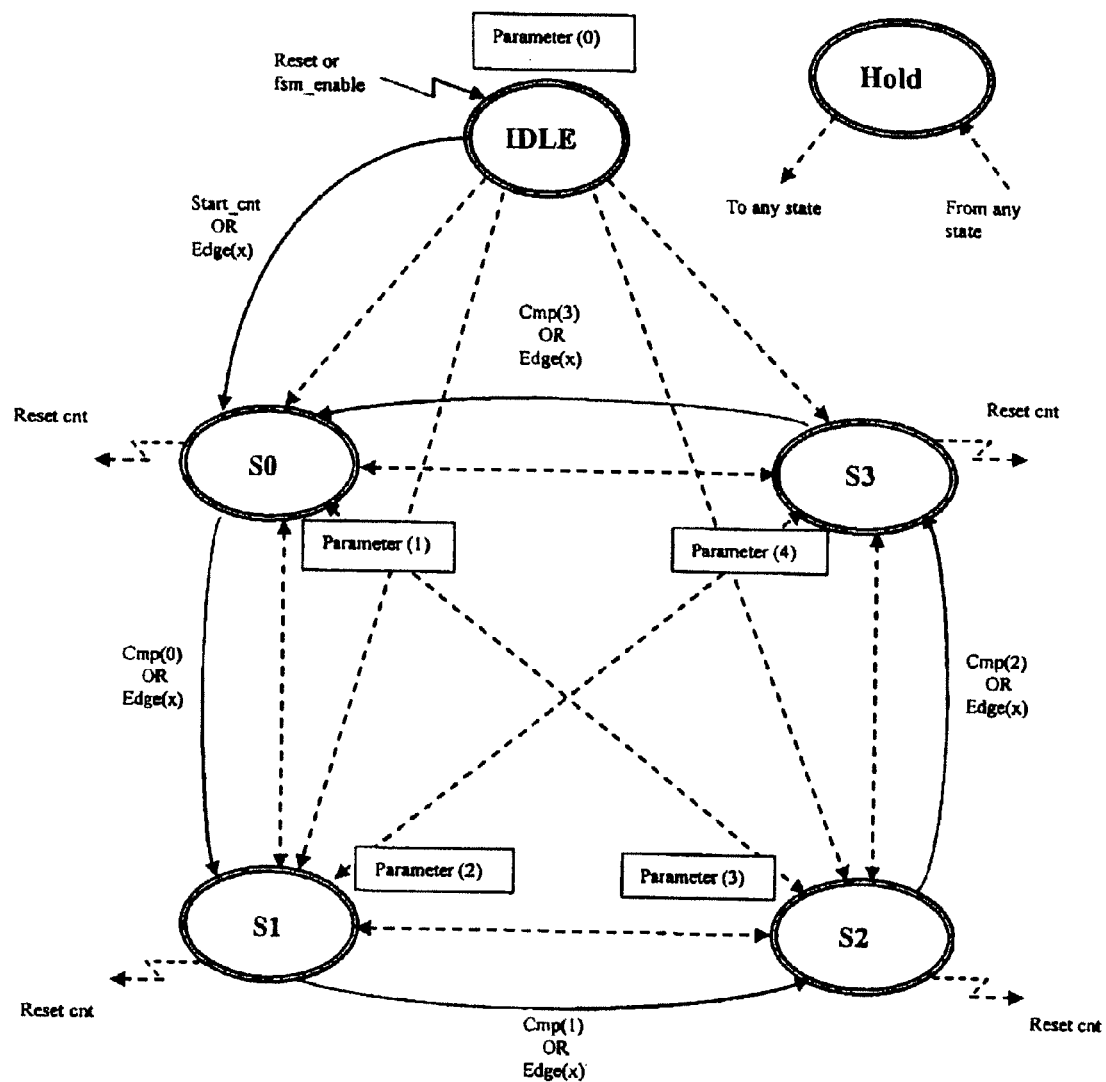

*FIG. 1*
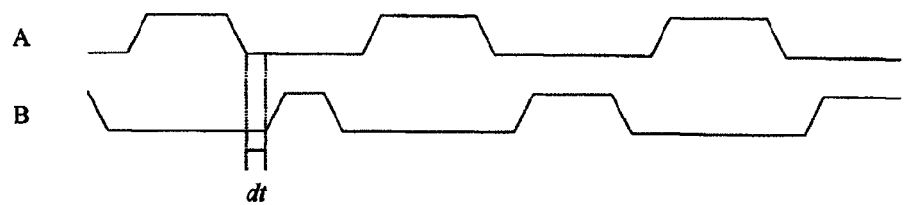
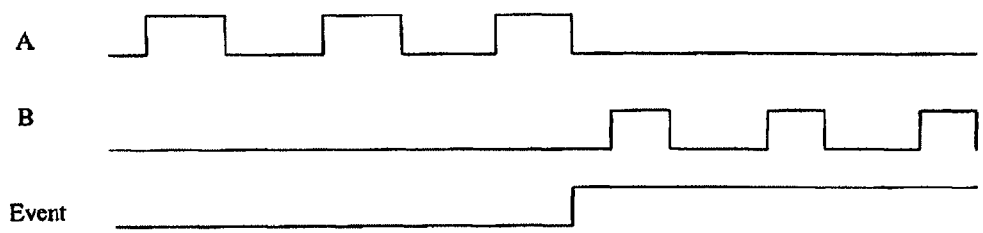
*FIG. 3*
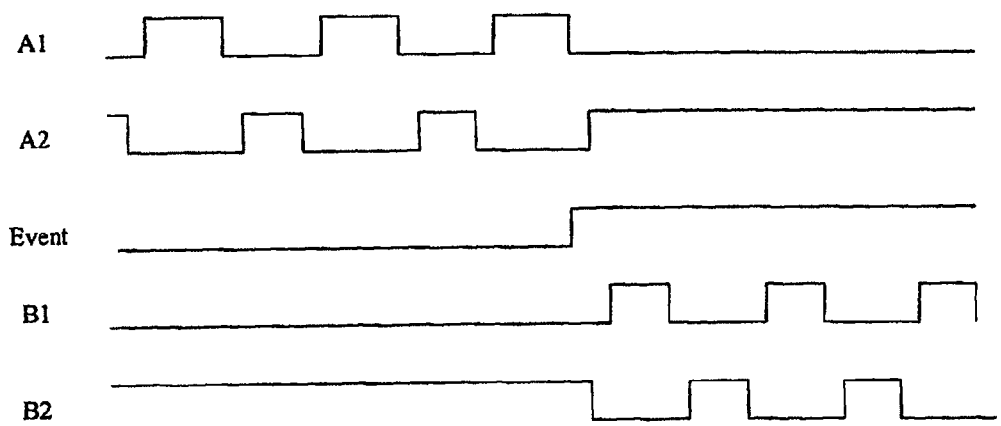
*FIG. 4*

STATE MACHINE FOR GENERATING A PULSE WIDTH MODULATION (PWM) WAVEFORM

RELATED APPLICATION

The present application claims priority of Italian Patent Application No. TO2008A000996 filed Dec. 29, 2008, which is incorporated herein in its entirety by this reference.

FIELD OF THE INVENTION

The present description refers to state machines.

The present description was devised with particular attention paid to the possible use for generating arbitrary waveforms.

DESCRIPTION OF THE RELATED ART

Various fields of application provide for the generation of arbitrary waveforms, for example according to a Pulse Width Modulation or PWM, which depend on external signals and/or on programmed period values. Some applications provide for generating at least one pair of PWM signals with a determined ON and OFF relation.

FIG. 1 is a diagram representing the time profile of two PWM waveforms, respectively indicated with A and B, correlated to each other. This example provides for waveform B to be at a low level when waveform A is at a high level, and vice versa.

In some cases, it is desired to provide for that instead of the ascent and descent fronts of A and B being coincident, a given (controlled) time interval may exist in which both waveforms are at low level (see, e.g., the time interval dt of FIG. 1).

In order to meet the needs outlined above, the current solutions are represented by timers with counters for generating suitable timings. There are solutions that provide for the possibility to change the level of the waveform according to external events.

SUMMARY OF THE INVENTION

The inventors realized that a drawback of the current solutions lies in the lack of modularity and in the impossibility to correlate the generation of two or more waveforms as a function of the input signals and the status of the outputs.

Another drawback lies in the poor configurability, such to often require designing a special state machine for generating a particular sequence of waveforms.

The present invention has the object of overcoming the drawbacks outlined previously.

According to the invention, such object is attained due to a state machine having the characteristics specifically referred to in the claims that follow.

The claims form an integral part of the technical disclosure provided herein in relation to the invention.

In an embodiment, the solution described allows overcoming the drawbacks outlined previously, offering the possibility to generate arbitrary waveforms by means of a single state machine provided with a group of configuration registers.

In an embodiment, the solution described herein is represented by an event-driven programmable state machine.

In an embodiment, the machine uses a micro-controller or any other means capable of configuring the registers to obtain the desired function.

A possible embodiment is represented by a machine having at least two states plus an idle state.

In an embodiment, the level of the output signal is also configurable.

In an embodiment, the state machine is capable of changing state as a function of an internal timer and/or as a function of external events suitably synchronized.

In an embodiment, programming registers can be used to set logic functions that determine the cause of the change of state.

An advantage of the solution described herein is modularity. In an embodiment, input ports and output signals are provided capable of connecting two machines to each other in such a manner to generate correlated waveforms.

In an embodiment, a state machine made up of two elementary state machines may in turn be connected with another, equivalent one, for example to generate four waveforms whose phase relation can be configured.

BRIEF OF THE DRAWINGS

Figure 5:
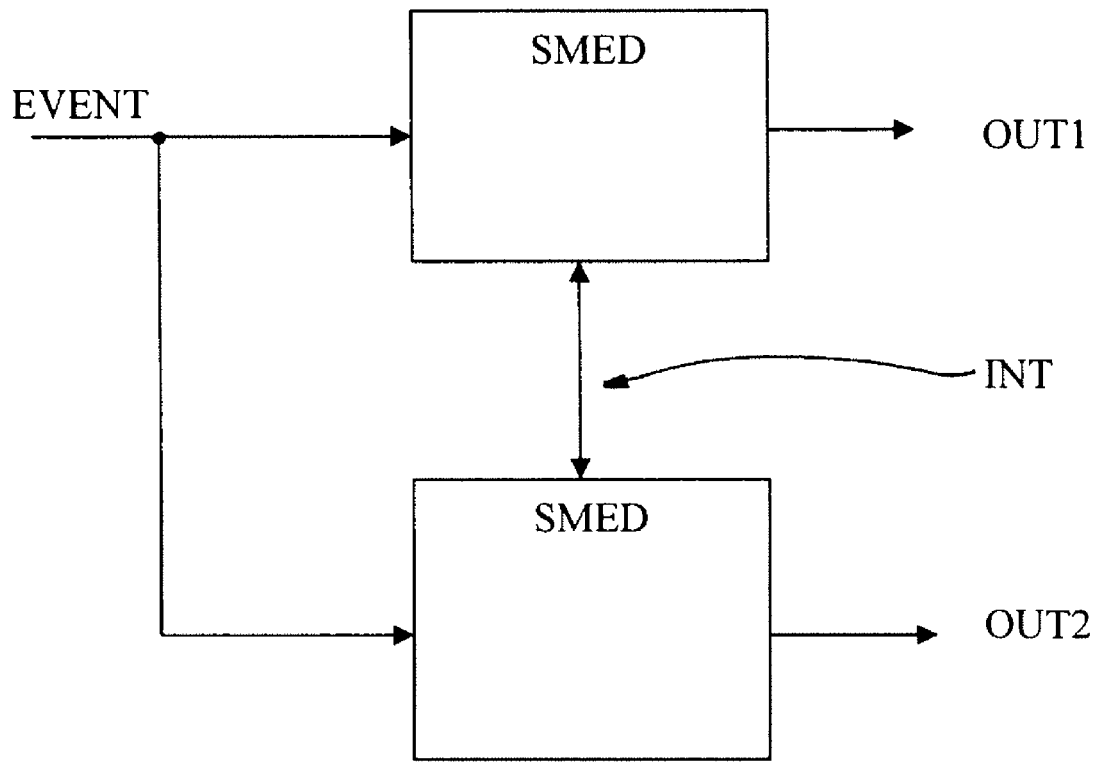
Figure 6:
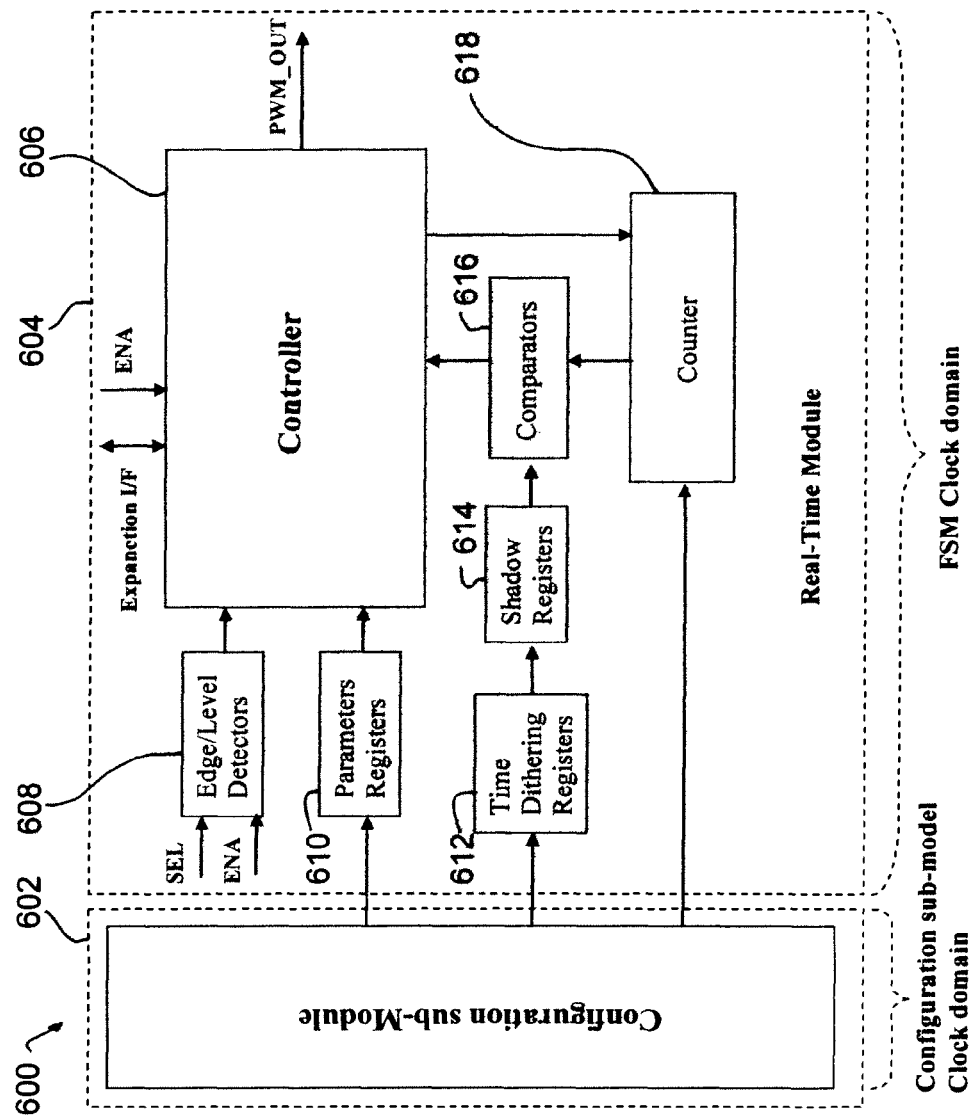

Now, the invention shall be described, strictly for exemplifying and non-limiting purposes, with reference to the attached representations, wherein:

FIG. 1 is a diagram representing the time profile of two PWM waveforms correlated to each other, FIG. 2 is a graph representing an embodiment of a state machine, FIGS. 3 and 4 represent waveforms suitable to be generated using the state machine of FIG. 2, FIG. 5 illustrates the possible connection of two state machines, and FIG. 6 illustrates a possible embodiment of a state machine of the present invention, including a configuration module and a hardware real-time module.

Figure 7:
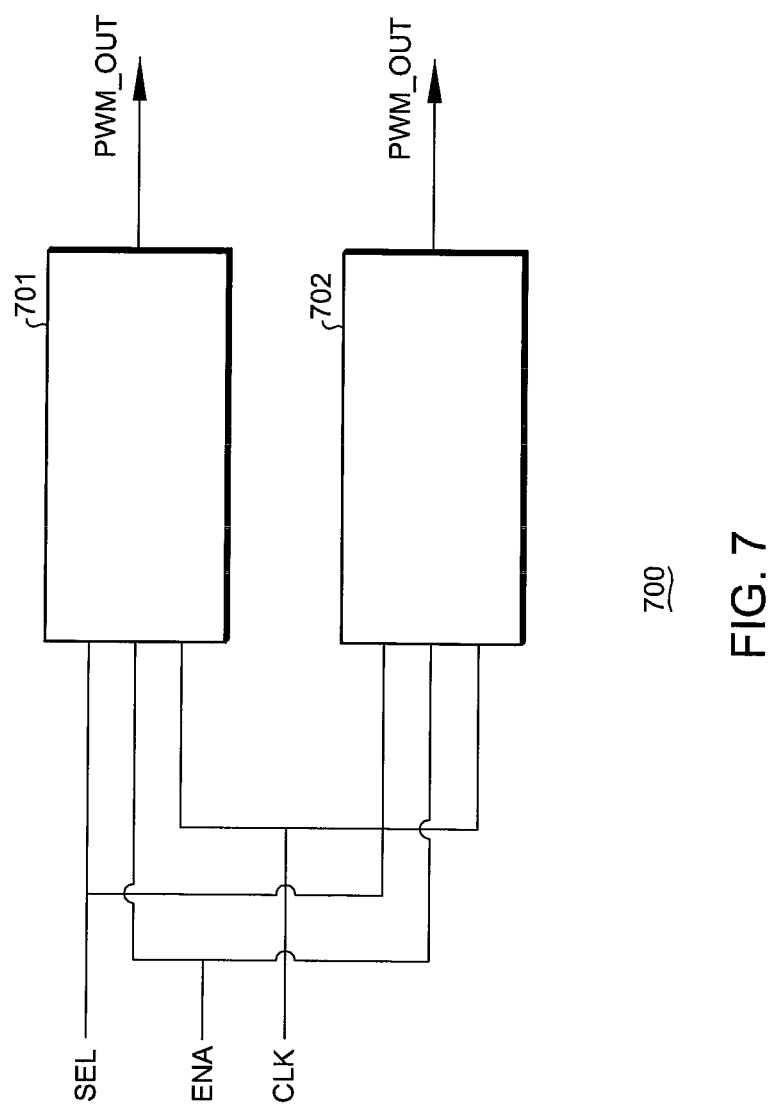

FIG. 7 illustrates an exemplary embodiment of a state machine in combination with a homologous machine according to an embodiment of the invention.

DETAILED DESCRIPTION OF PREFERRED EMBODIMENTS

Illustrated in the following description are various specific details aimed at providing an in-depth understanding of the embodiments. The embodiments may be obtained without one or more specific details, or through other methods, components, materials etc. In other cases, known structures, materials or operations are not shown or described in detail to avoid obscuring the various aspects of the embodiments. Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner in one or more embodiments.

References herein are only used for facilitating the reader and thus they do not define the scope of protection or the scope of the embodiments.

FIG. 2 illustrates a finite state machine capable of generating a waveform as a function of the configuration of parameters and external events.

A state machine as represented in FIG. 2 is suitable to be implemented in the form of a logic network of any type).

According to its current state, the network which implements the state machine assigns a determined level to one or more output signals. These may be generated, for example, by power and/or current generators that "sense" the current state of the state machine and produce a corresponding level signal.

In an embodiment, the output signal level is also configurable.

All this corresponds to criteria per se known in the art, hence not requiring a detailed description herein.

In the illustrated embodiment, the state machine includes five states indicated as S0, S1, S2 and S3 and IDLE (i.e. deactivated).

In an embodiment, associated to the machine is a microcontroller (or any equivalent means) capable of configuring the registers to be able to obtain the desired function.

The IDLE state is attained due to a machine enabling signal (fsm_enable) or a reset signal. In particular, the IDLE state is attainable through a reset signal of the machine counter (Reset cnt) starting from each of the states S0, S1, S2 and S3.

Each state generally corresponds to the emission of output signals with at least one different parameter (Parameter(n) with n=0, 1, 2, 3, 4 where Parameter (0) refers to the IDLE state).

Further provided for is "Hold" state in which it is possible, after initial configuration, to move from any state to any state.

The state machine is capable of changing state as a function of an internal timer and/or as a function of external events suitably synchronized.

In the illustrated embodiment the starting of the machine counter (Start_cnt) i.e. an ascent front (or descent front) of a given signal x (Edge(x)), representing an external event determine the passage from the IDLE state to state S0.

The state machine is capable of "going through" all the states S0, S1, S2 and S3 (i.e. rotate in sequence through such states), as represented with the full line, as a function of the state of the comparator (Cmp(n)) and/or of external events.

However, the passage between the IDLE, S0, S1, S2 and S3 states may also occur freely, i.e. outside the predetermined sequence, through the transitions indicated with dashed lines and suitable to represent programmable transitions as a function of the state of the comparator (Cmp(n)) and/or of the external events.

In various embodiments, the working parameters of the state machine can be varied by software means.

In an embodiment it is thus possible, for example by means of programming registers, to set logic functions that determine the cause of the passage of state.

In the state machine of FIG. 2 the passage from one state to another is thus determined, generally, by the following relation:

1) (Cmp(n) OR Edge(x)) AND Edge (y)) with n=0, 1, 2, 3
2) Edge (y)

so as to allow the outputs to depend on one or more external parameters.

For example, FIG. 3 refers to the possibility of generating, through a machine as represented in FIG. 2, two PWM modulated signals, indicated respectively with A and B. The two signals may differ from each other in terms of parameters such as, for example, the repetition frequency, the duty cycle and/or the phase with respect to a reference signal, amplitude and they are emitted alternatively with respect to each other depending on the level ("low" or "high") of the Event signal representing an external event.

An advantage of the solution described lies in the modularity, in that two (or possibly more) machines of the type described herein may be connected to each other through input ports and the respective output signals in such a manner to generate correlated waveforms.

FIG. 5 shows an example of connection between two state machines (SMED), the connection being performed through a synchronous/asynchronous interface (IN) such a manner to obtain a "combined" machine capable of generating two output waveforms (OUT1, OUT2) correlated to each other and function of the same input events (Event).

In an embodiment, a state machine like the one illustrated in FIG. 2 may in turn be connected with another equivalent one, for example to generate four waveforms whose phase relation can be configured.

FIG. 4 shows an example of waveforms A1, A2, B1, B2 suitable to be generated through such solution.

In particular, references A1, A2, on one hand, and B1, B2, on the other are two pairs of PWM modulated signals. In the two pairs, the signals may differ from each other in terms of parameters such as repetition frequency, duty cycle, relative phase, amplitude. The two pairs of signals are emitted in an alternating fashion with respect to each other depending on the level ("low" or "high") of an Event signal representing an external event.

Referring now to FIG. 6, an embodiment according to the present invention comprises a system 600 which includes two sub-models belonging to two different clock domains. One is the FSM, which includes a real time event driven module 604 that manages the signal transitions of the user application. The other module 602 handles the configuration process. The means used to configure the FSM could be, for example, a microcontroller 606 or any other means that can configure the internal hardware registers of the state machine.

The actual FSM shown in FIG. 6 is a hardware solution which only needs to be configured and then advances only driven by a clock and external events. It does not require the execution of any software code. The FSM also implements an internal dithering function.

An example of a realization of the hardware state machine is shown in FIG. 6.

The controller 606 is the real time module core, and it is primarily a Finite State Machine (FSM) of six states.

For each of the five main states (not hold state) there are some parameters that configure the related state behavior. In this way it is possible to change the FSM behavior simply by re-configuring the parameters. The configuration module 602 takes care to correctly configure the real time module, by correctly programming the parameter registers 610. The expansion interface allows the realization of a cluster FSM architecture. The controller 606 is in further communication with the configuration sub-module 602 through time dithering registers 612, shadow registers 614, and comparators 616, as well as counter 618. Edge level detector 608 is also coupled to the controller 606, and receives the SEL and ENA input signals.

Many other variations of the embodiment of the state machine shown in FIG. 6 having different hardware and software implementations can be realized. The interchangeability of hardware and software blocks to realize a specific function is well known by those skilled in the art.

Obviously, without prejudice to the principle of the present invention, the details and embodiments may vary, even significantly, with respect to what has been described herein by way of non-limiting example only, without departing from the scope of the invention as defined by the attached claims.

FIG. 7 illustrates an exemplary embodiment of a state machine in combination with a homologous machine according to an embodiment of the invention.

Combination 700 comprises a first state machine 701 and a homologous state machine 702. An exemplary embodiment of state machines 701 and 702 are disclosed in FIG. 6. Each of the state machines 701 and 702 take at least one common signal representative of events external to the machines in the combination. These include the SEL and ENA input signals and a clock (CLK) signal. Further, combination 700 can include additional state machines. Therefore, combination 700 has state machine 701 in combination with at least one homologous machine 702 generates signals coordinated therebetween as a function of at least one common signal representative of events external to the machines in the combination.

We claim:

1. A system for generating Pulse Width Modulation (PWM) signals comprising a hardware real time event driven module, said hardware real time event driven module comprising a real time module core comprising a state machine for generating signals, said state machine generating different output signals according to the current state of the machine and changing state both as a function of an internal timer and as a function of signals representative of events external to the state machine, wherein the levels of said output signals are configurable, and wherein the transitions between the states of said state machine are programmable transitions.

2. The system of claim 1, wherein the state machine states include at least two active states plus an idle state.

3. The system of claim 2, wherein the state machine states include a hold state wherein transition from any state to any state in the machine is possible.

4. The system of claim 2, configured to evolve freely through of at least some of said states as a function of said internal timer and/or as a function of at least one signal representative of events external to the state machine.

5. The system of claim 2, in combination with at least one homologous machine, to generate signals coordinated therebetween as a function of at least one common signal representative of events external to the machines in the combination.

6. The system machine of claim 1, wherein the state machine states include a hold state wherein transition from any state to any state in the state machine is possible.

7. The system of claim 6, further comprising a register having an associated processor to configure said register.

8. The system of claim 1, further comprising a register having an associated processor to configure said register.

9. The system of claim 1, configured to evolve through a sequence of at least some of said states as a function of said internal timer and/or as a function of at least one signal representative of events external to the state machine.

10. The system of claim 1, in combination with at least one homologous machine, to generate signals coordinated therebetween as a function of at least one common signal representative of events external to the machines in the combination.

11. The system of claim 1 further comprising parameter registers programmable via a configuration module for setting said output signals.

12. The system of claim 1 wherein the logic functions that determine the cause of the passage of the state are settable by programming registers.

13. The system of claim 1 further comprising an edge level detector for receiving said signals representative of events external to the state machine.

14. The system of claim 1 further comprising constant time and dithering registers, shadow registers, comparators, and counters, wherein said state machine is configured to change state as a function of the state of said comparators.

15. A state machine for generating Pulse Width Modulation (PWM) waveform signals, comprising a configuration module in a hardware real-time module, said state machine generating different PWM waveform signals according to the current state of the machine, and changes state both as a function of an internal timer and as a function of signals representative of events external to the state machine, wherein the levels of said waveform signals are configurable, and wherein the transitions between the states of said state machine are programmable transitions.

16. The state machine of claim 15, wherein the state machine states include at least two active states and an idle state.

* * * * *